(12) United States Patent
Goldberg

(10) Patent No.: US 6,917,281 B1
(45) Date of Patent: Jul. 12, 2005

(54) METHOD AND APPARATUS FOR TRANSMITTING AND DECODING PRE-PROGRAMMED MESSAGES

(75) Inventor: Steven Jeffrey Goldberg, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 681 days.

(21) Appl. No.: 09/611,633

(22) Filed: Jul. 7, 2000

(51) Int. Cl.[7] .............................. H04Q 1/30; G08B 1/08
(52) U.S. Cl. .................... 340/7.53; 340/7.23; 340/539.1
(58) Field of Search .............................. 340/7.53, 7.58, 340/531, 539.1, 501, 517, 524, 825.36, 7.2, 7.51, 7.21, 7.22, 7.23, 500, 539, 10.2, 3.1, 3.3, 3.31

(56) References Cited

U.S. PATENT DOCUMENTS

| | | | | |
|---|---|---|---|---|
| 4,559,526 A | * | 12/1985 | Tani et al. ................... | 340/539 |
| 4,799,059 A | * | 1/1989 | Grindahl et al. ........... | 340/10.2 |
| 4,940,974 A | * | 7/1990 | Sojka ......................... | 340/10.2 |
| 4,962,377 A | * | 10/1990 | Wallace et al. ............. | 340/7.29 |
| 5,155,469 A | * | 10/1992 | Hartmann et al. .......... | 340/539 |
| 5,166,664 A | * | 11/1992 | Fish ............................ | 340/539 |
| 5,307,349 A | * | 4/1994 | Shloss et al. ............... | 340/10.2 |
| 5,477,215 A | * | 12/1995 | Mandelbaum ........... | 340/10.51 |
| 5,530,437 A | | 6/1996 | Goldberg ................ | 340/825.08 |
| 5,576,700 A | * | 11/1996 | Davis et al. ................ | 340/3.31 |
| 5,649,294 A | * | 7/1997 | Ayerst et al. ............... | 340/7.22 |
| 5,918,158 A | * | 6/1999 | LaPorta et al. ............. | 340/7.29 |
| 5,929,779 A | * | 7/1999 | MacLellan et al. ......... | 340/10.2 |
| 5,952,922 A | * | 9/1999 | Shober ....................... | 340/10.4 |
| 5,973,613 A | * | 10/1999 | Reis et al. .................. | 340/7.23 |
| 6,054,928 A | * | 4/2000 | Lemelson et al. ........ | 340/573.4 |

* cited by examiner

*Primary Examiner*—Brian Zimmerman
*Assistant Examiner*—Clara Yang
(74) *Attorney, Agent, or Firm*—Louis R. Breeden; Matthew C. Loppnow

(57) ABSTRACT

Each of a plurality of wireless communication units (102) is pre-programmed (402) with a plurality of orthogonal codes corresponding to a plurality of canned messages, the plurality of orthogonal codes chosen such that when a group of different canned messages are received simultaneously by a wireless processing device (104), thereby producing an interference symbol pattern, the interference symbol pattern provides a non-zero probability of correctly decoding at least some of the group. A portion of the plurality of wireless communication units then detects (404) a triggering event. Each of the portion selects (406) one of the plurality of canned messages as a selected message to be transmitted in response to the triggering event, and transmits (408) one of the plurality of orthogonal codes corresponding to the selected message during a randomly-selected slotted-aloha time slot.

21 Claims, 4 Drawing Sheets

| MEANING OF CANNED MESSAGE (602) | CODE SENT FOR MESSAGE (604) |
|---|---|
| FIRE | 0001 |
| EXPLOSION | 0010 |
| FLOOD | 0100 |
| INTRUDER | 1000 |

*600*

400

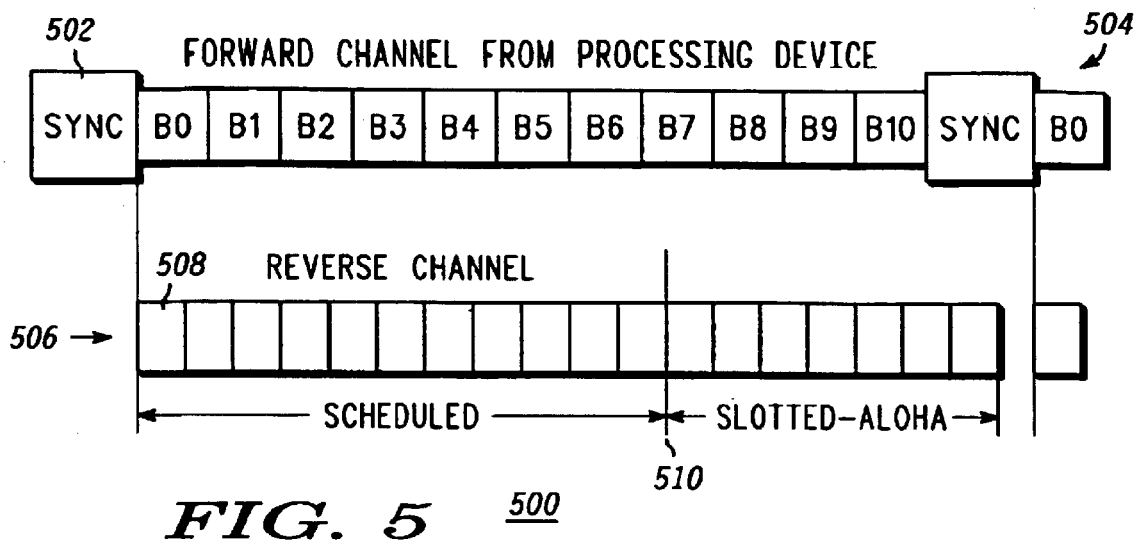

METHOD AND APPARATUS FOR TRANSMITTING AND DECODING PRE-PROGRAMMED MESSAGES

FIELD OF THE INVENTION

This invention relates in general to wireless communication systems, and more specifically to a method and apparatus for transmitting and decoding pre-programmed messages.

BACKGROUND OF THE INVENTION

Projections indicate that devices which can communicate wirelessly will proliferate in the near future. An example of such devices is wireless sensors for reporting triggering events, such as fire, explosion, gas leaks, and intruders, to name a few, by sending pre-programmed ("canned") messages. A large number of devices requesting service at substantially the same time in response to a triggering event can overwhelm classical random access methods, such as slotted aloha. In the prior aloha art, collisions have resulted in loss of data and a need for the colliding devices to retransmit at randomly selected times. The retransmissions have further increased traffic, resulting in still more collisions and loss of data. The result has been a reduced ability to communicate compared to normal traffic periods.

Thus, what is needed is a method and apparatus for transmitting and decoding pre-programmed messages. The method and apparatus preferably will operate to reduce the need for retransmissions after a collision occurs.

BRIEF DESCRIPTION OF THE DRAWINGS

FIG. 5 is an exemplary timing diagram depicting forward and reverse channels of the wireless communication system in accordance with the present invention.

FIG. 6 is a table depicting example canned messages and corresponding orthogonal codes transmitted for each of the canned messages in accordance with the present invention.

FIG. 7 is a table depicting example received interference symbol patterns and the possible colliding messages that are decoded in accordance with the present invention.

DETAILED DESCRIPTION OF THE DRAWINGS

Figure 1:
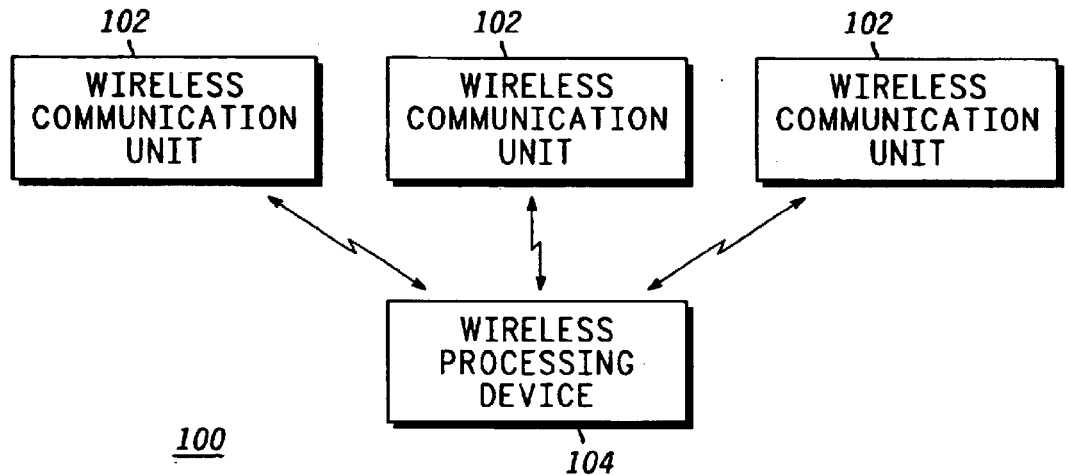
FIG. 1 is an electrical block diagram of a wireless communication system in accordance with the present invention.

FIG. 1 is an electrical block diagram of a wireless communication system 100 in accordance with the present invention, comprising a plurality of wireless communication units 102 and a wireless processing device 104. The wireless communication system 100 preferably uses a two-way transmission protocol similar to the well-known FLEX™ two-way messaging protocol available from Motorola, Inc. of Schaumburg, Ill. In particular, for sending unsolicited messages to the wireless processing device 104, the wireless communication units 102 utilize a slotted aloha transmission synchronized by a sync signal transmitted periodically by the wireless processing device 104, as described further below.

Figure 2:
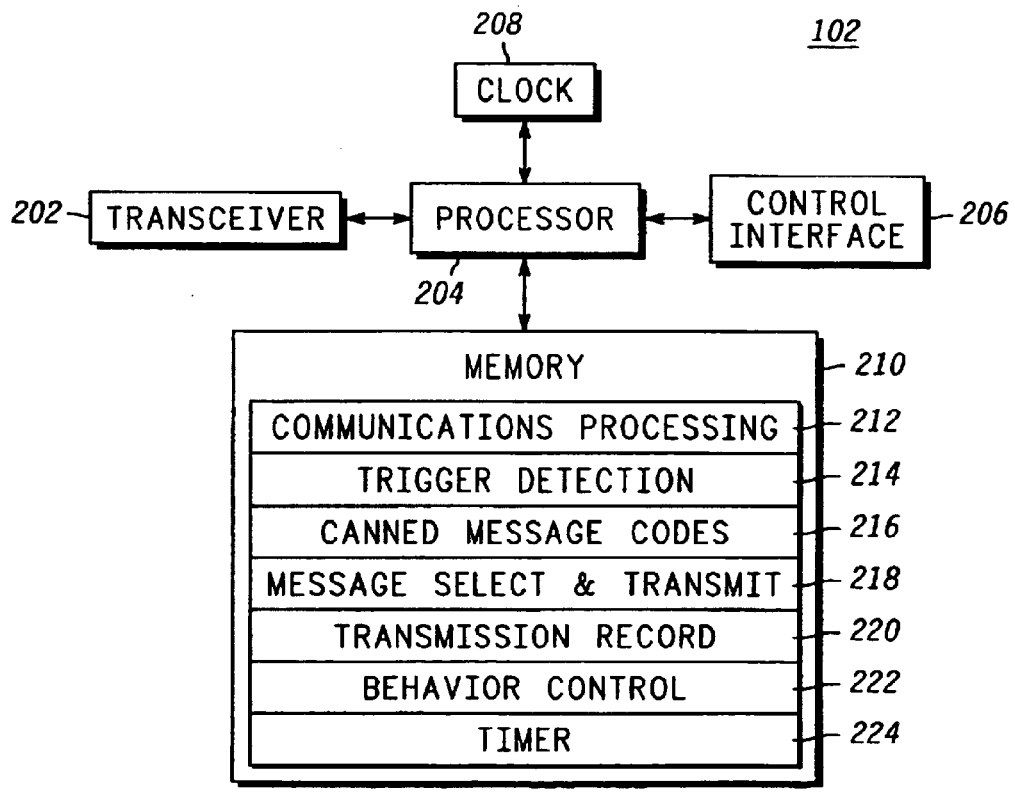
FIG. 2 is an electrical block diagram of a wireless communication unit in accordance with the present invention.

FIG. 2 is an electrical block diagram of the wireless communication unit 102 in accordance with the present invention. The wireless communication unit 102 comprises a conventional transceiver 202 for sending canned (pre-programmed) messages wirelessly to the wireless processing device 104. The transceiver 202 is coupled to a conventional processor 204 for processing the canned messages. The processor is coupled to a control interface 206 for interfacing with a plurality of conventional sensors (not shown) for detecting triggering events, such as fire, gas, explosion, intruder alert, and the like. Alternatively, the control interface 206 can include a conventional keypad for interfacing with a human. A conventional clock 208 is coupled to the processor 204 for providing a timing signal. A memory 210 is also coupled to the processor 204 for storing operating variables and software for programming the processor 204 in accordance with the present invention.

The memory 210 comprises a communications processing program 212 for programming the processor 204 to process communications with the wireless processing device 104 through well-known techniques. The memory 210 further comprises a trigger detection program 214 for cooperating with the control interface 206 to detect the occurrence of a triggering event. The memory 210 also includes a plurality of canned message codes 216 corresponding to a plurality of canned messages. Preferably the canned message codes are orthogonal codes chosen such that when a group of different canned messages are received simultaneously by the wireless processing device 104, thereby producing an interference symbol pattern, the interference symbol pattern provides a non-zero probability of correctly decoding at least some of said group, and a substantially zero probability of erroneously decoding a canned message not in the group.

In addition, the memory 210 includes a message select and transmit program 218 for programming the processor 204 to select and transmit one of the canned message codes 216 corresponding to a triggering event in response to a triggering event having occurred. The memory 210 further comprises a transmission record 220 for recording and time-stamping each canned message sent. The memory also includes a behavior control program 222 for programming the processor 204 to behave as instructed by the wireless processing device 104 after sending a canned message to the wireless processing device 104. In addition, the memory 210 comprises a timer program 224 for programming the processor 204 to cooperate with the clock 208 to generate a delay before generating a retransmission of the canned message in accordance with the present invention. Operation of the wireless communication unit 102 in accordance with the present invention is described further herein below.

Figure 3:
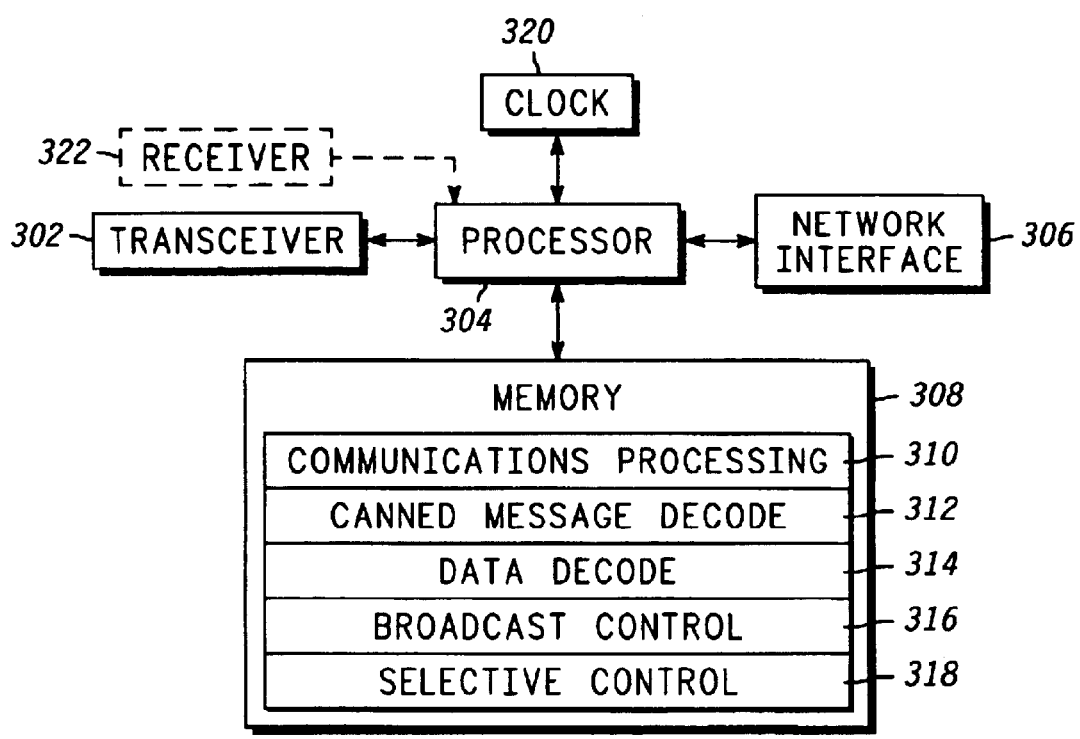
FIG. 3 is an electrical block diagram of a wireless processing device in accordance with the present invention.

FIG. 3 is an electrical block diagram of the wireless processing device 104 in accordance with the present invention. The wireless processing device 104 comprises a conventional transceiver 302 for communicating wirelessly with the wireless communication unit 102. The transceiver 302 is coupled to a conventional processor 304 for processing the canned messages. The processor 304 preferably is coupled to a conventional network interface 306 for interfacing with a network, e.g., the Internet, a local area network, or a telephone network, to name a few. It will be appreciated that, alternatively, the network interface 306 can be omitted, and the wireless processing device 104 can be operated as a stand-alone processing device. The wireless processing device 104 also includes a conventional clock 320 coupled to the processor 304 for providing a timing signal. A memory 308 is also coupled to the processor 304 for storing operating variables and software for programming the processor 304 in accordance with the present invention. Optionally, the wireless processing device 104 can be coupled to one or more additional receivers 322, thereby coupling the wireless processing device 104 to a plurality of receivers, preferably non-collocated. When this option is used, the wireless processing device 104 preferably examines canned messages received at multiple ones of the plurality of receivers to extract additional information about the canned messages received, e.g., to detect a signal that may have been rendered undetectable at the transceiver 302 by a simultaneous higher-powered signal. The memory 308 comprises a communications processing program 310 for programming the processor 304 to process communications with the wireless communication unit 102 through well-known techniques. The memory 308 further comprises a canned message decode program 312 for programming the processor 304 to decode received canned messages in accordance with the present invention. The memory 308 also includes a data decode program 314 for programming the processor to decode additional data which can be sent along with a canned message code. In addition, the memory 308 includes a broadcast control program 316 for programming the processor 304 to send instructions to the plurality of wireless communication units 102 to alter the behavior of some of the wireless communication units 102. The memory 308 further comprises a selective control program 318 for programing the processor 304 to selectively control specific ones of the plurality of wireless communication units 102 as to whether the specific ones are allowed to generate one of the plurality of canned messages. Operation of the wireless processing device 104 in accordance with the present invention is described further herein below.

Figure 4:
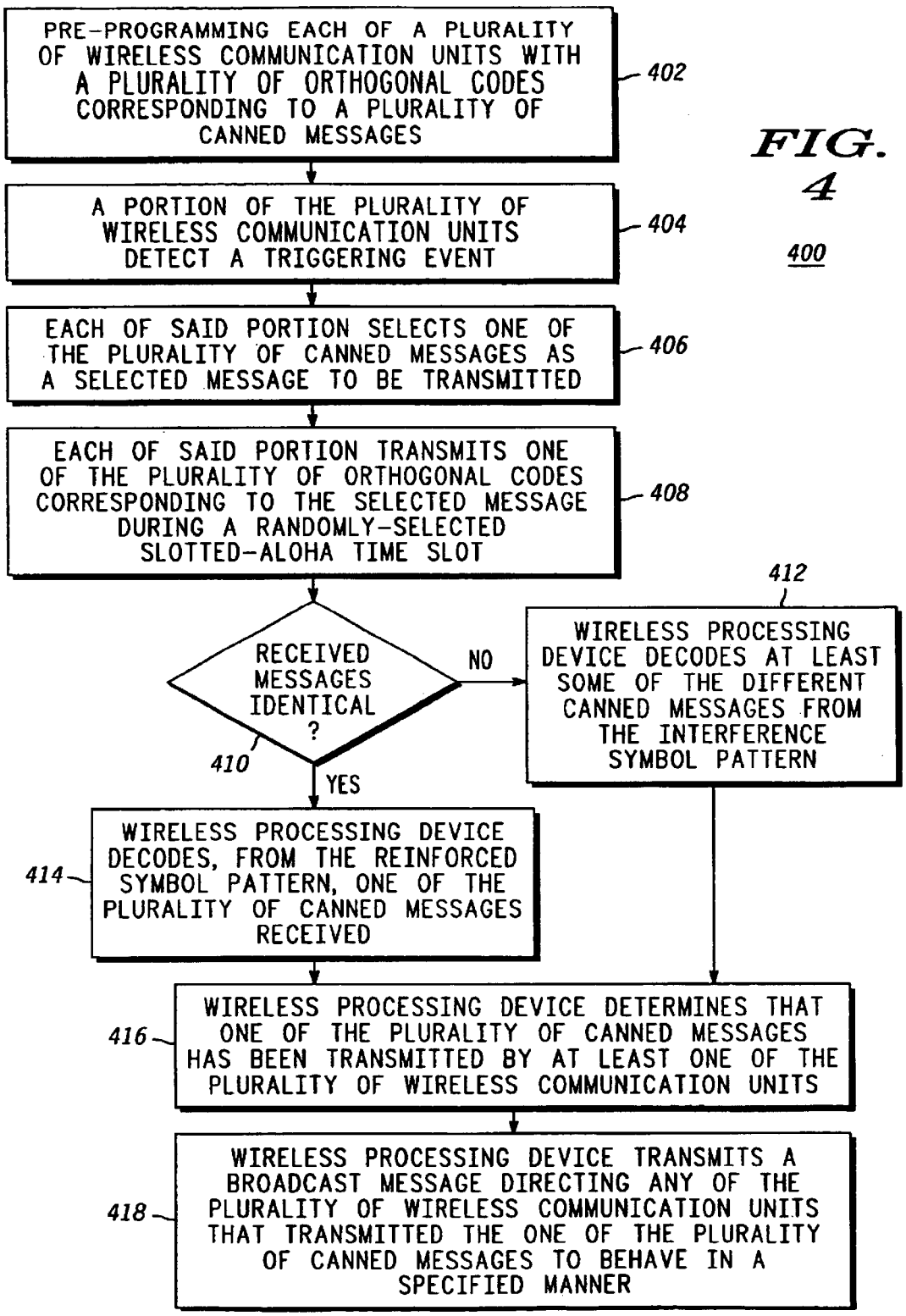
FIG. 4 is a flow diagram depicting operation of the wireless communication system in accordance with the present invention.

FIG. 4 is a flow diagram 400 depicting operation of the wireless communication system in accordance with the present invention. The flow begins with pre-programming 402 each of the plurality of wireless communication units 102 with a plurality of orthogonal codes corresponding to a plurality of canned messages. The plurality of orthogonal codes are preferably chosen such that when a group of different canned messages are received simultaneously by the wireless processing device 104, thereby producing an interference symbol pattern, the interference symbol pattern provides a non-zero probability of correctly decoding at least some of the group, and a substantially zero probability of erroneously decoding a canned message not in the group. Next, a portion of the plurality of wireless communication units 102 detect 404 a triggering event, e.g., a fire, explosion, flood, or intruder, to name a few. In response to detecting the triggering event, each of the portion selects 406 one of the plurality of canned messages as a selected message to be transmitted. Then, each of the portion transmits 408 one of the plurality of orthogonal codes corresponding to the selected message during a randomly-selected slotted-aloha time slot. The slotted-aloha time slots are preferably synchronized by a periodically transmitted synchronization signal sent from the wireless processing device 104, as will be explained below. Because the aloha slots are synchronized, the symbol positions of two or more canned messages which collide in the same aloha time slot will occur substantially simultaneously. The result is that when the colliding canned messages are identical to each other, they reinforce each other; and when they are different, they produce an interference symbol pattern in which some of the symbol positions may be indeterminate, i.e., neither a one nor a zero in a binary transmission scheme, for example.

When the wireless processing device 104 decodes each aloha time slot, the wireless processing device 104 attempts to determine whether any of the symbols are indeterminate. If not, the wireless processing device 104 concludes that it has received either a single message or multiple identical messages in the time slot, and the wireless processing device 104 decodes 414 the one of the plurality of canned messages received. If the wireless processing device 104 does find indeterminate symbols, it concludes that it has received multiple non-identical messages, and the wireless processing device 104 decodes at least some of the at least two different canned messages from the interference symbol pattern. How this is done is explained further herein below.

In either case, when the wireless processing device 104 has determined 416 that one of the plurality of canned messages has been transmitted by at least one of the plurality of wireless communication units 102, the wireless processing device 104 then transmits 418 a broadcast message indicating that the one of the plurality of canned messages has been received, and directing any of the plurality of wireless communication units 102 that transmitted the one of the plurality of canned messages to behave in a specified manner. The specified manner can, for example, be that senders are to cease transmission unless explicitly instructed to do so by the wireless processing device 104. Another example of the specified manner is that wireless communication units 102 that transmitted the one of the plurality of canned messages are to identify themselves during a predetermined set of slotted aloha time slots on a predetermined communication channel. A third example of the specified manner is that senders are not to initiate a newly triggered generation of the one of the plurality of canned messages until notified by the wireless processing device 104. In addition, the wireless processing device 104 can selectively control specific ones of the plurality of wireless communication units 102 as to whether the specific ones are allowed to generate one of the plurality of canned messages. Also, to prevent a proliferation of repeated messages, it is preferred that after producing a first generation of a canned message in response to the triggering event, the wireless communication unit 102 will prevent a second generation of the canned message for a predetermined time period after the first generation.

FIG. 5 is an exemplary timing diagram 500 depicting forward and reverse channels of the wireless communication system 100 in accordance with the present invention. Here, the forward channel 504 is defined to be directed from the wireless processing device 104 to the wireless communication unit 102, and the reverse channel 506 is defined to be directed from the wireless communication unit 102 to the wireless processing device 104. Note that the time slots of the reverse channel 506 preferably are synchronized by the sync signal 502 of the forward channel 504, the first time slot 508 of the reverse channel beginning immediately after the sync signal 502. The reverse channel 506 is preferably divided into scheduled and slotted aloha time slots by a movable demarcation 510 assigned by the wireless processing device 104. When the wireless processing device 104 has identified a particular wireless communication unit 102 with which the wireless processing device 104 needs to communicate, the wireless processing device 104 preferably assigns one or more of the scheduled time slots of the reverse channel to be used by the wireless communication unit 102. When the wireless processing device 104 has not yet identified the particular wireless communication unit 102 (as when one or more canned messages have just been received), the wireless processing device 104 can send a broadcast message directing all who sent the type(s) of canned message(s) received to identify themselves using the slotted aloha time slots. In some cases, e.g., for short messages during light traffic, it can be desirable to send data with the canned message. While the data probably will not survive a collision in a high traffic situation, the probability of a collision in light traffic is low, and airtime can be reduced as compared to sending only the canned message and then setting up a scheduled time slot for sending the data.

FIG. 6 is a table 600 depicting example canned messages and corresponding orthogonal codes transmitted for each of the canned messages in accordance with the present invention. The example canned message meanings are shown in a first column 602, while the corresponding orthogonal codes are shown in a second column 604. Note that the example codes each contain three zeros and a single one, and that the ones for the four codes all fall in different symbol positions. By selecting the codes in this manner, whenever two or more of the plurality of wireless communication units 102 transmit two or more different codes during the same time slot, an interference symbol pattern is generated in the transceiver 302 of the wireless processing device 104. The interference symbol pattern advantageously makes it possible for the wireless processing device 104 to identify at least some of the two or more different codes transmitted. In addition, the interference symbol pattern further advantageously makes it virtually impossible to erroneously decode a canned message which was not one of the two or more different codes transmitted. It will be appreciated that additional canned messages can be accommodated by increasing the number of symbols in the orthogonal codes.

FIG. 7 is a table 700 depicting a few example received interference symbol patterns and the possible colliding messages that are decoded in accordance with the present invention. The received interference symbol patterns are shown in the first column 702, while the possible colliding messages are in the second column 704. The letter "X" is used to indicate indeterminate symbols, i.e., symbols that are neither a one nor a zero. Note from the table 600 of FIG. 6 that the only combination of messages which can cause the first interference symbol pattern 706 is the explosion and fire combination. Similarly, only intruder and fire can cause the second interference symbol pattern 708, and only explosion and flood can cause the third interference symbol pattern 710. If all the symbol positions are indeterminate, as in the fourth interference symbol pattern 712, then it can be concluded that all four canned messages were transmitted in the same time slot.

One method of detecting indeterminate symbols is to sample each symbol position a plurality of times. If the samples of a single symbol position are sometimes a one and other times a zero, the symbol is indeterminate. Another method in a frequency shift keyed system is to measure energy in the frequency domain, through well-known Fourier transform techniques. If energy peaks are found at both the frequency representing binary zero and the frequency representing binary one, then the symbol is indeterminate. It will also be appreciated that under some conditions indeterminate symbols can be difficult or impossible to detect. An example of a condition that can cause this is two different canned messages sent in the same time slot and received at widely differing power levels. In this case, the dominant signal can appear to be the only signal received. Nonetheless, one of the two signals (the dominant one) can be decoded correctly, thereby eliminating one retry, and the wireless communication unit 102 which generated the weaker signal will retry (and, if lucky, not collide) after a timeout.

It should be clear from the preceding disclosure that the present invention provides a method and apparatus for transmitting and decoding pre-programmed messages. The method and apparatus advantageously operates to reduce the need for retransmissions after a collision occurs, thereby increasing the available throughput of a slotted aloha channel.

Many modifications and variations of the present invention are possible in light of the above teachings. For example, while the embodiments described herein above depict the use of single bit symbols for clarity, it should be recognized that symbols of more than one bit can be utilized. Thus, it is to be understood that, within the scope of the appended claims, the invention can be practiced other than as specifically described herein above.

What is claimed is:

1. A transmission method in a wireless communication system, the transmission method comprising the steps of:

pre-programming each of a plurality of wireless communication units with a plurality of orthogonal codes corresponding to a plurality of canned messages, the plurality of orthogonal codes chosen such that when a group of different canned messages are received simultaneously by a wireless processing device of the wireless communication system, thereby producing an interference symbol pattern, the interference symbol pattern provides a non-zero probability of correctly decoding at least some of said group, and a substantially zero probability of erroneously decoding a canned message not in said group;

detecting, by a portion of the plurality of wireless communication units, a triggering event that does not originate from, and is not controlled by, the wireless communication system;

selecting, by each of said portion, one of the plurality of canned messages as a selected message to be transmitted in response to the triggering event; and transmitting, by each of said portion, one of the plurality of orthogonal codes corresponding to the selected message during a randomly-selected slotted-aloha time slot.

2. The transmission method of claim 1, further comprising in the wireless processing device the steps of:

receiving at least two different canned messages sent simultaneously during a single time slot, thereby producing the interference symbol pattern; and decoding at least some of the at least two different canned messages from the interference symbol pattern.

3. The transmission method of claim 1, further comprising in the wireless processing device the steps of:

receiving at least two identical canned messages sent simultaneously during a single time slot, thereby producing a reinforced symbol pattern; and decoding, from the reinforced symbol pattern, one of the plurality of canned messages received.

4. The transmission method of claim 1, wherein the transmitting step further comprises the step of transmitting, by some of said portion, additional data along with the one of the plurality of orthogonal codes.

5. The transmission method of claim 1, further comprising in the wireless processing device the steps of:

determining that one of the plurality of canned messages has been transmitted by at least one of the plurality of wireless communication units; and sending a broadcast message directing any of the plurality of wireless communication units that transmitted the one of the plurality of canned messages to identify themselves during a predetermined set of slotted aloha time slots on a predetermined communication channel.

6. The transmission method of claim 1, further comprising in the wireless processing device the steps of:
   determining that one of the plurality of canned messages has been transmitted by at least one of the plurality of wireless communication units; and
   sending a broadcast message indicating that the one of the plurality of canned messages has been received and that senders are to cease transmission unless explicitly instructed to do so by the wireless processing device.

7. The transmission method of claim 1, further comprising in one of the plurality of wireless communication units the steps of:
   producing a first generation of the canned message in response to the triggering event; and
   preventing a second generation of the canned message for a predetermined time period after the first generation.

8. The transmission method of claim 1, further comprising in the wireless processing device the steps of:
   determining that one of the plurality of canned messages has been transmitted by at least one of the plurality of wireless communication units; and
   sending a broadcast message indicating that the one of the plurality of canned messages has been received and that senders are not to initiate a newly triggered generation of the one of the plurality of canned messages until notified by the wireless processing device.

9. The transmission method of claim 1, further comprising in the wireless processing device the step of selectively controlling specific ones of the plurality of wireless communication units as to whether the specific ones are allowed to generate one of the plurality of canned messages.

10. The transmission method of claim 1,
    wherein the wireless processing device is coupled to a plurality of receivers, and
    wherein the transmission method further comprises in the wireless processing device the step of examining canned messages received at multiple ones of the plurality of receivers to extract additional information about the canned messages received.

11. A wireless communication unit in a wireless communication system, comprising:
    a transceiver for providing communications with other wireless devices in the wireless communication system;
    a processor coupled to the transceiver for processing the communications;
    a memory coupled to the processor for storing operating variables and software for programming the processor;
    a clock coupled to the processor for providing a time signal; and
    a control interface coupled to the processor for controlling the wireless communication unit,
    wherein the memory is pre-programmed with a plurality of orthogonal codes corresponding to a plurality of canned messages, the plurality of orthogonal codes chosen such that when a group of different canned messages are received simultaneously by a wireless processing device of the wireless communication system, thereby producing an interference symbol pattern, the interference symbol pattern provides a non-zero probability of correctly decoding at least some of said group, and a substantially zero probability of erroneously decoding a canned message not in said group, and
    wherein the processor is programmed to:
        cooperate with the control interface to detect a triggering event that does not originate from, and is not controlled by, the wireless communication system;
        select one of the plurality of canned messages as a selected message to be transmitted in response to the triggering event; and
        cooperate with the transceiver to transmit one of the plurality of orthogonal codes corresponding to the selected message during a randomly-selected slotted-aloha time slot.

12. The wireless communication unit of claim 11, wherein the processor is further programmed to cooperate with the transceiver to transmit additional data along with the one of the plurality of orthogonal codes.

13. The wireless communication unit of claim 11, wherein the processor is further programmed to:
    save a time-stamped record in the memory whenever the processor transmits the selected message;
    receive a broadcast message directing any of a plurality of wireless communication units that transmitted the one of the plurality of canned messages to behave in a specified manner;
    check the time-stamped record to determine whether the one of the plurality of canned messages was transmitted by the wireless communication unit less than a predetermined time ago; and
    when the check is positive, behave in the specified manner.

14. The wireless communication unit of claim 11, wherein the processor is further programmed to:
    produce a first generation of the canned message in response to the triggering event; and
    prevent a second generation of the canned message for a predetermined time period after the first generation.

15. The wireless communication unit of claim 11, wherein the processor is further programmed to:
    cooperate with the transceiver to receive from the wireless processing device a message for selectively controlling the wireless communication unit as to whether the wireless communication unit is allowed to generate one of the plurality of canned messages.

16. A wireless processing device in a wireless communication system for decoding a plurality of canned messages, the wireless processing device comprising:
    a transceiver for receiving the plurality of canned messages; and
    a processor coupled to the transceiver for processing the plurality of canned messages, wherein the plurality of canned messages are represented by a corresponding plurality of orthogonal codes chosen such that when a group of different canned messages are received simultaneously by the wireless processing device, thereby producing an interference symbol pattern, the interference symbol pattern provides a non-zero probability of correctly decoding at least some of said group, and a substantially zero probability of erroneously decoding a canned message not in said group, and
    wherein the processor is programmed to:
        cooperate with the transceiver to receive at least two different canned messages sent during a single time slot, the at least two different canned messages selected in response to a triggering event, thereby producing the interference symbol pattern; and
        decode at least some of the at least two different canned messages from the interference symbol pattern.

17. The wireless processing device of claim 16, wherein the processor is further programmed to:

cooperate with the transceiver to receive at least two identical canned messages sent simultaneously during the single time slot, thereby producing a reinforced symbol pattern; and decode, from the reinforced symbol pattern, one of the plurality of canned messages received.

18. The wireless processing device of claim 16, wherein the processor is further programmed to:

decode additional data received along with one of the plurality of orthogonal codes.

19. The wireless processing device of claim 16, wherein the processor is further programmed to:

cooperate with the transceiver to receive and decode one of the plurality of canned messages, and cooperate further with the transceiver to transmit a broadcast message directing any of a plurality of wireless communication units that transmitted the one of the plurality of canned messages to behave in a specified manner.

20. The wireless processing device of claim 16, wherein the processor is further programmed to:

cooperate with the transceiver to transmit messages to selectively control specific ones of a plurality of wireless communication units as to whether the specific ones are allowed to generate one of the plurality of canned messages.

21. The wireless processing device of claim 16, further comprising a network interface coupled to the processor and coupled to a network for communicating with the network.

* * * * *